(12) United States Patent
Kingry

(10) Patent No.: US 10,110,730 B1
(45) Date of Patent: Oct. 23, 2018

(54) ZONE CONTROL SYSTEM

(71) Applicant: Frederic Kelly Kingry, Fairhope, AL (US)

(72) Inventor: Frederic Kelly Kingry, Fairhope, AL (US)

( * ) Notice: Subject to any disclaimer, the term of this patent is extended or adjusted under 35 U.S.C. 154(b) by 0 days.

(21) Appl. No.: 15/379,024

(22) Filed: Dec. 14, 2016

Related U.S. Application Data

(60) Provisional application No. 62/268,156, filed on Dec. 16, 2015.

(51) Int. Cl.
| | |
|---|---|
| *H04W 24/00* | (2009.01) |
| *H04M 3/00* | (2006.01) |
| *H04M 1/725* | (2006.01) |
| *H04W 76/04* | (2009.01) |
| *H04W 76/20* | (2018.01) |
| *H04W 88/02* | (2009.01) |

(52) U.S. Cl.
CPC ....... *H04M 1/72577* (2013.01); *H04W 76/04* (2013.01); *H04W 76/20* (2018.02); *H04W 88/02* (2013.01)

(58) Field of Classification Search
CPC ............................................. H04W 4/00–4/22
See application file for complete search history.

(56) References Cited

U.S. PATENT DOCUMENTS

| | | | |
|---|---|---|---|
| 2007/0004451 A1* | 1/2007 | Anderson | G06F 1/1626 455/556.1 |
| 2007/0101426 A1* | 5/2007 | Lee | G06F 21/554 726/22 |
| 2008/0059888 A1* | 3/2008 | Dunko | G06F 1/1613 715/744 |
| 2009/0023458 A1* | 1/2009 | Mountney | H04W 16/14 455/456.1 |
| 2010/0069115 A1* | 3/2010 | Liu | H04M 1/72569 455/556.1 |
| 2011/0256800 A1* | 10/2011 | Jennings | G01S 1/70 446/456 |

* cited by examiner

*Primary Examiner* — San Htun

(57) ABSTRACT

A control box with control box hardware has an ON operative orientation. A primary printed circuit board has primary software operative in response to the orientation. The primary software when in the operational orientation functions to disseminate a blocking/filtering signals within a predetermined operational controlled zone. A digital wireless device performs normal digital wireless device functions. Digital wireless device hardware functions for switching between an inoperative orientation and an operative orientation. A secondary printed circuit board/software has secondary software operative to switch to the inoperative orientation in response to the digital wireless device entering the operational controlled zone to preclude the digital wireless device from performing normal digital wireless device functions.

1 Claim, 3 Drawing Sheets

ZONE CONTROL SYSTEM

BACKGROUND OF THE INVENTION

Related Application

This application is based upon Provisional Application No. 62/268,156 filed Dec. 16, 2015, the priority of which is claimed and the subject matter of which is incorporated herein by reference.

Field of the Invention

The present invention relates to a zone control system and more particularly pertains to establishing an operational controlled zone in which digital wireless devices should not be used and for precluding unwanted usage of digital wireless devices in the operational controlled zone, the establishing and precluding being done in a safe, convenient, and economical manner. The system functions in special environments including personal, corporate, educational, and vehicle.

Description of the Prior Art

The use of zone control systems of known designs and configurations is known in the prior art. More specifically, zone control systems of known designs and configurations previously devised and utilized for the purpose of precluding unwanted usage of digital wireless devices are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, the aforementioned patents do not describe a zone control system that allows establishing an operational controlled zone in which digital wireless devices should not be used and for precluding unwanted usage of digital wireless devices in the operational controlled zone, the establishing and precluding being done in a safe, convenient, and economical manner.

In this respect, the zone control system according to the present invention substantially departs from the conventional concepts and designs of the prior art, and in doing so provides an apparatus primarily developed for the purpose of establishing an operational controlled zone in which digital wireless devices should not be used and for precluding unwanted usage of digital wireless devices in the operational controlled zone, the establishing and precluding being done in a safe, convenient, and economical manner. The system functions in special environments including personal, corporate, educational, and vehicle.

Therefore, it, can be appreciated that there exists a continuing need for a new and improved zone control system which can be used for establishing an operational controlled zone in which digital wireless devices should not be used and for precluding unwanted usage of digital wireless devices in the operational controlled zone, the establishing and precluding being done in a safe, convenient, and economical manner. The system functions in special environments including personal, corporate, educational, and vehicle. In this regard, the present invention substantially fulfills this need.

SUMMARY OF THE INVENTION

In view of the disadvantages inherent in the known types of zone control systems of known designs and configurations now present in the prior art, the present invention provides an improved zone control system. as such, the general purpose of the present invention, which will be described subsequently in greater detail, is to provide a new and improved zone control system and method which has all the advantages of the prior art and none of the disadvantages.

From a broad perspective of the invention, first provided, is a control box. Next control box hardware is provided including an ON operative orientation. Next, a primary printed circuit board is provided including primary software operative in response to the orientation. The primary software when in the operational orientation functions to disseminate a signal that activates a digital wireless device, further programmed, within a predetermined operational controlled zone. A digital wireless device, such as a Blue tooth or Wife or the like, is next provided. The digital wireless device performs normal digital wireless device functions.. Lastly, a secondary printed circuit board is provided. The secondary printed circuit board/app/program includes secondary software operative to switch the ON/OFF button to the inoperative orientation in response to the digital wireless device entering the operational controlled zone to preclude the digital wireless device from performing normal digital wireless device functions. Such components are individually configured and correlated with respect to each other so as to attain the desired objective.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be Understood that the invention is not limited in, its application to the details of construction and to the arrangements of the components set forth in the following description or illustrated in the drawings. The invention is capable of other embodiments. and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including such equivalent constructions insofar as they do not depart from the spirit and scope of the present invention.

It is therefore an object of the present invention to provide a new and improved zone control system which has all of the advantages of the prior art zone control systems of known designs and configurations and none of the disadvantages.

It is another object of the present invention to provide a new and improved zone control system which may be easily and efficiently used, manufactured, and marketed.

It is further object of the present invention to provide a new and improved zone control system which is of durable and reliable constructions.

An even further object of the present invention is to provide a new and improved zone control system which is susceptible of a low cost of manufacture with regard to both materials and labor, and which accordingly is then susceptible of low prices of sale to the consuming public, thereby making such zone control system economically available to the buying public.

Lastly, even still another object of the present invention is to provide a zone control system for a new and improved zone control system which can be used for establishing an operational controlled zone in which digital wireless devices should not be used and for precluding unwanted usage of digital wireless devices in the operational controlled zone, the establishing and precluding being done in a safe, convenient, and economical manner. The system functions in special environments including personal, corporate, educational, and vehicle.

These together with other objects of the invention, along with the various features of novelty which characterize the invention, are pointed out with particularity in, the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
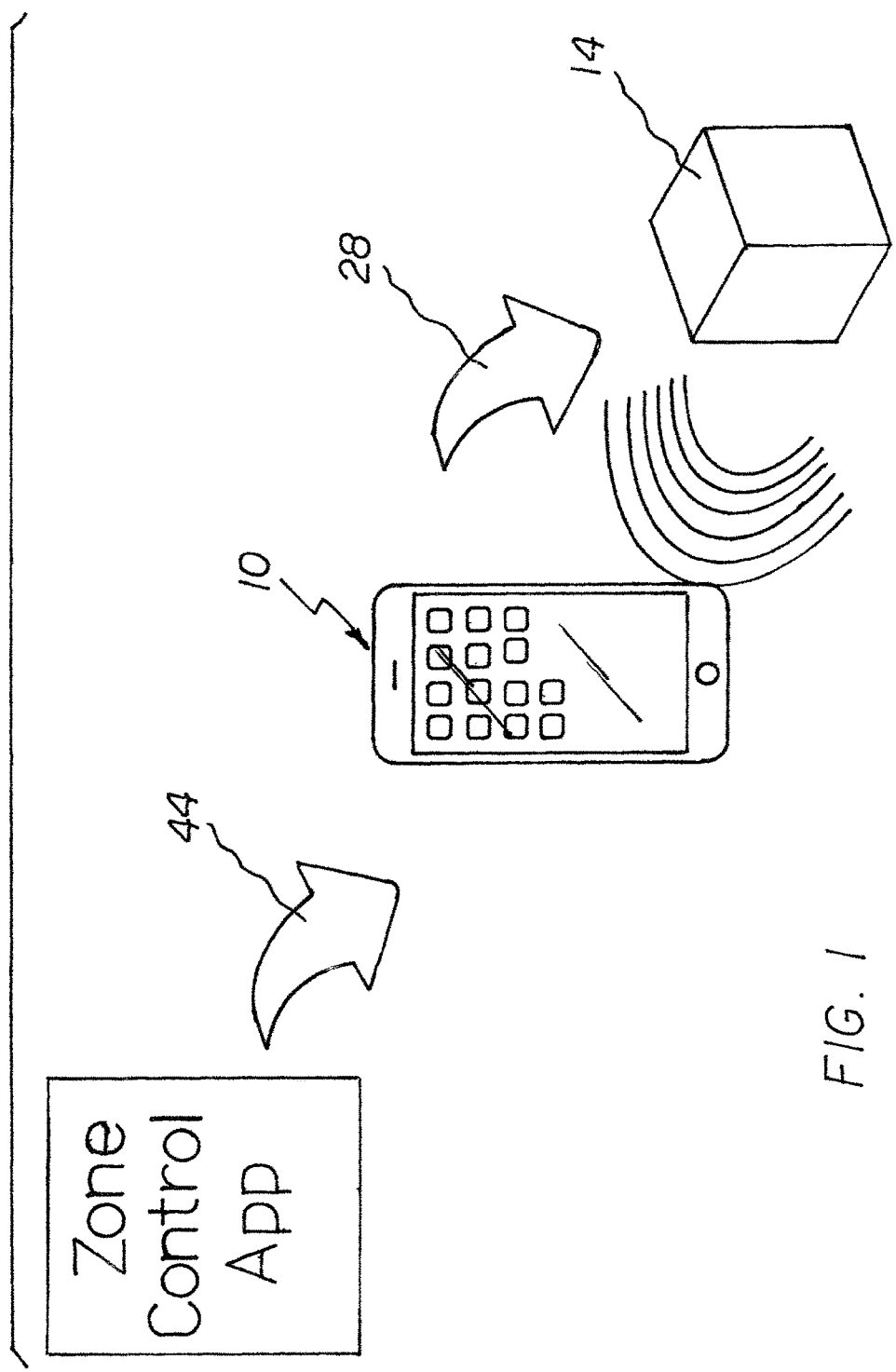
FIG. 1 is a schematic illustration of a zone control system constructed in accordance with the principles of the present invention.
Figure 2:
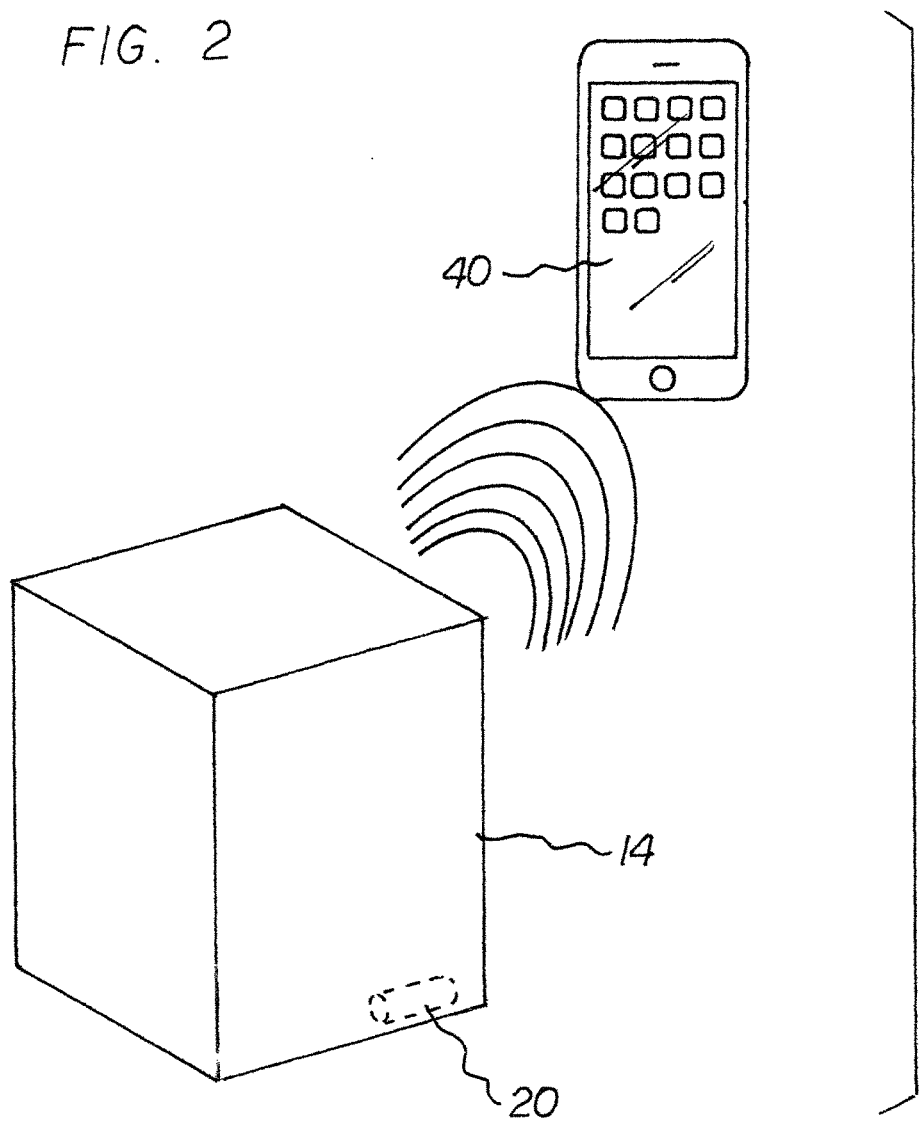
FIG. 2 is a schematic illustration of a zone control system showing the operational radius of the control box.
Figure 3:
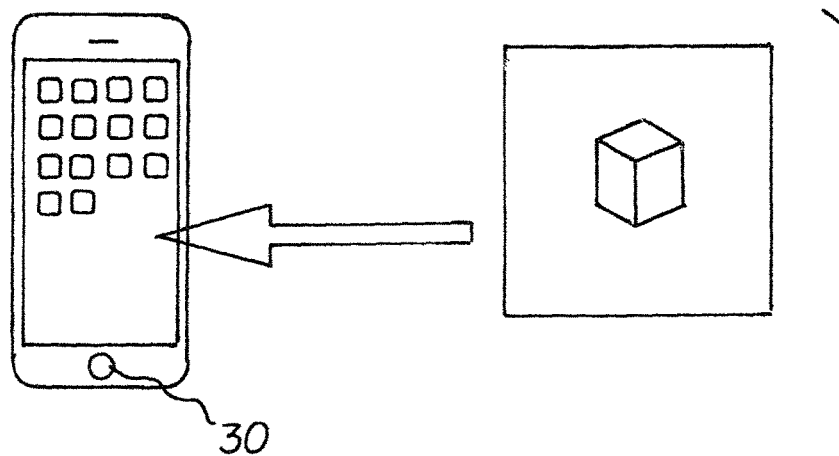
FIG. 3 is a schematic illustration of a zone control system showing the home page of one digital wireless device with zone control emergency contact phone numbers.
Figure 3:
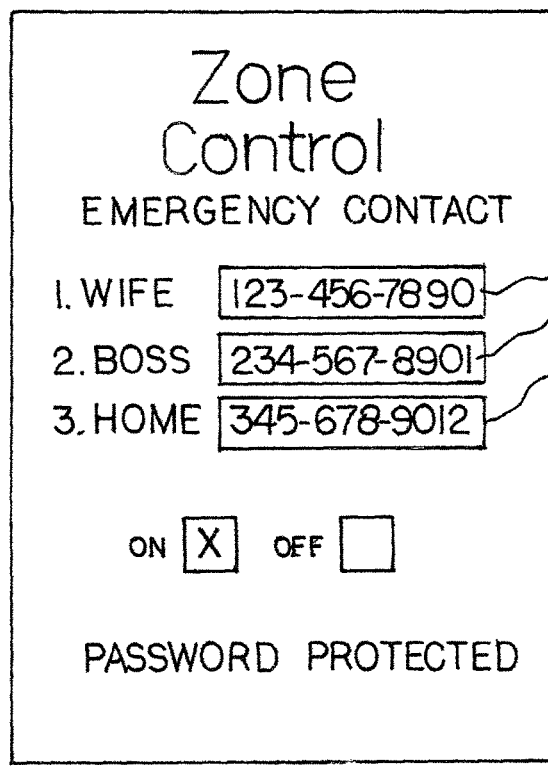

With reference now to the drawings, and in particular to FIG. 1 thereof, the preferred embodiment of the new and improved zone control system embodying the principles and concepts of the present invention and generally designated by the reference numeral 10 will be described.

The present invention, the zone control system 10 is comprised of a plurality of components. In their broadest context such include a control box, control box hardware, a primary printed circuit board, software, a digital wireless device, digital wireless device hardware, and a secondary printed circuit board. Such components are individually configured and correlated with respect to each other so as to attain the desired objective.

From a specific standpoint, in the preferred embodiment of the zone control system, designated by reference numeral 10, first provided is a control box 14 having, but not limited to, a cubical configuration. The control box has an exterior and an interior.

Next provided is control box hardware. The control box hardware includes a control box battery 20, or other power source, in the interior of the control box.

Control box software 14 is next provided. The control box software is in the interior of the control box. The control box software when in an operational orientation functions to disseminate a blocking/filtering signal within a predetermined operational controlled zone. In the primary, preferred embodiment of the invention, the zone control system (ZCS) incudes an area signal, an existing app/program on a digital wireless device and an existing wireless network.

Next provided is a control box app 28 downloaded to the control box software.

A digital wireless device 30 is next provided. The digital wireless device has a generally rectilinear configuration. The digital wireless device has an exterior and an interior. The digital wireless device functions to perform normal digital wireless device functions including making phone calls, receiving phone calls, ringing in response to receiving a phone call, texting, and surfing the net.

Next, digital wireless device hardware is provided by downloading. The digital wireless device hardware includes a digital wireless device battery 30, or other source of potential, in the interior of the control box.

Next, digital wireless device software 40 is provided. and is downloaded into the interior of the digital wireless device. The digital wireless device software is operative to switch an auto switch of the digital wireless device to the inoperative orientation in response to the digital wireless device entering the operational controlled zone. The digital wireless device software when in an operational orientation functions in response to the blocking signal within the predetermined operational controlled zone to preclude the digital wireless device from performing normal digital wireless device functions.

Next, a digital wireless device app 44 is provided. The digital wireless device app is downloaded to the digital wireless device software of the digital wireless device.

Lastly, the app,/software/program and a screen 48 is provided on the exterior of the digital wireless device. The screen, functions to display spaces for a plurality of emergency contact telephone numbers. The plurality of emergency contact telephone numbers are chosen from the class consisting of spouse, boss, and home, incoming phone calls from one of the plurality of emergency contact phone numbers being excepted from the disseminated blocking/filtering signal. In this manner, phone calls may be conducted to and from any one of the emergency contact telephone numbers. The control box app operates in the background, whereby there is no visible indication that the digital wireless device app is running other than an indicator on the screen that the zone control software is functioning.

The zone control app runs in the background and turns on digital wireless devices already in the zone by taking control within the zone.

The control box software provides zone control levels including:
  a) a safe mode with no incoming calls other than from one of the emergency contact telephone numbers;
  b) a BIZ mode allowing outgoing calls in basically an airplane mode;
  c) a shutdown mode allowing outgoing text and e-mail messages; and
  d) a lock-down mode where nothing works other than the emergency contact telephone numbers;

Additional feature provided by the control box software include:
  a) all missed calls and texts and e-mails will show up in the screen after the digital wireless device is out of the operational controlled zone;
  b) all zone control levels being password protected;

c) always open lines with approved contacts for both sending and receiving; and d) automatically sending a message to any incoming transmission that the user is in a safe operational controlled zone and will resend as soon as possible.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A zone control system (10) for establishing an operational controlled zone in which digital wireless devices should not be used and for precluding unwanted usage of digital wireless devices in the operational controlled zone, the establishing and the precluding being done in a safe, convenient, and economical manner, the system functioning in special environments including personal, corporate, educational, and vehicle, the system comprising, in combination:

a control box (14) having an exterior, the control box having an interior;

control box hardware, the control box hardware being with or without an ON/OFF switch, the control box hardware including a control box source of potential (20) in the interior of the control box;

control box software in the interior of the control box, the control box software being operative in response to an ON orientation of the ON/OFF switch, the control box software when in an operational orientation functioning to disseminate a blocking/filtering signal within a pre-determined operational controlled zone;

a control box app (28) downloaded to the control box software;

a digital wireless device having a generally rectilinear configuration, the digital wireless device having an exterior and an interior, the digital wireless device functioning to perform normal digital wireless device functions including making phone calls, receiving phone calls, ringing in response to receiving a phone call, tenting, and surfing the net;

digital wireless device hardware on the exterior of the digital wireless device for switching between an OFF inoperative orientation and an ON operative orientation, the digital wireless device hardware including a digital wireless device source of potential (30) in the interior of the control box;

digital wireless device software (40) downloaded into the interior of the digital wireless device, the digital wireless device software being operative to switch the digital wireless device to the inoperative orientation in response to the digital wireless device entering the operational controlled zone, the digital wireless device software when in an operational orientation functioning in response to a blocking signal within the predetermined operational controlled zone to preclude the digital wireless device from performing normal digital wireless device functions;

a digital wireless device app downloaded to the digital wireless device software of the digital wireless device circuit board; and a screen (48) on the exterior of the digital wireless device functioning to display spaces for a plurality of emergency contact telephone numbers, the plurality of emergency contact telephone numbers being chosen from the class consisting of spouse, boss, and home, incoming phone call from one of the plurality of emergency contact phone numbers being excepted from the controlled zone whereby phone calls may be conducted to and from any one of the emergency contact telephone numbers, the control box app operating in the background whereby there is no visible indication that the digital wireless device app is running other than an indicator on the screen that the zone control software is functioning;

the control box software provides zone control levels including: a) a safe mode with no incoming calls other than from one of the emergency contact telephone numbers, b) a BIZ mode allowing outgoing calls in basically an airplane mode, c) a shutdown mode allowing outgoing text and e-mail messages, and d) a lockdown mode where nothing works other than the emergency contact telephone numbers;

additional features provided by the control box software include a) all missed calls and texts and e-mails will show up in the screen after the digital wireless device is out of the operational controlled zone, b) all zone control levels being password protected, c) always open lines with approved contacts for both sending and receiving, d) automatically sending a message to any incoming transmission that the user is in a safe operational controlled zone and will resend as soon as possible.

\* \* \* \* \*